March 7, 1967
F. W. KRUSE, JR
3,308,291
MICROWAVE FREQUENCY MEASURING BY ALTERNATELY
SAMPLING THE STANDING WAVE PATTERN OF
REFERENCE AND UNKNOWN FREQUENCY
SIGNALS IN A WAVEGUIDE
Filed Jan. 27, 1964
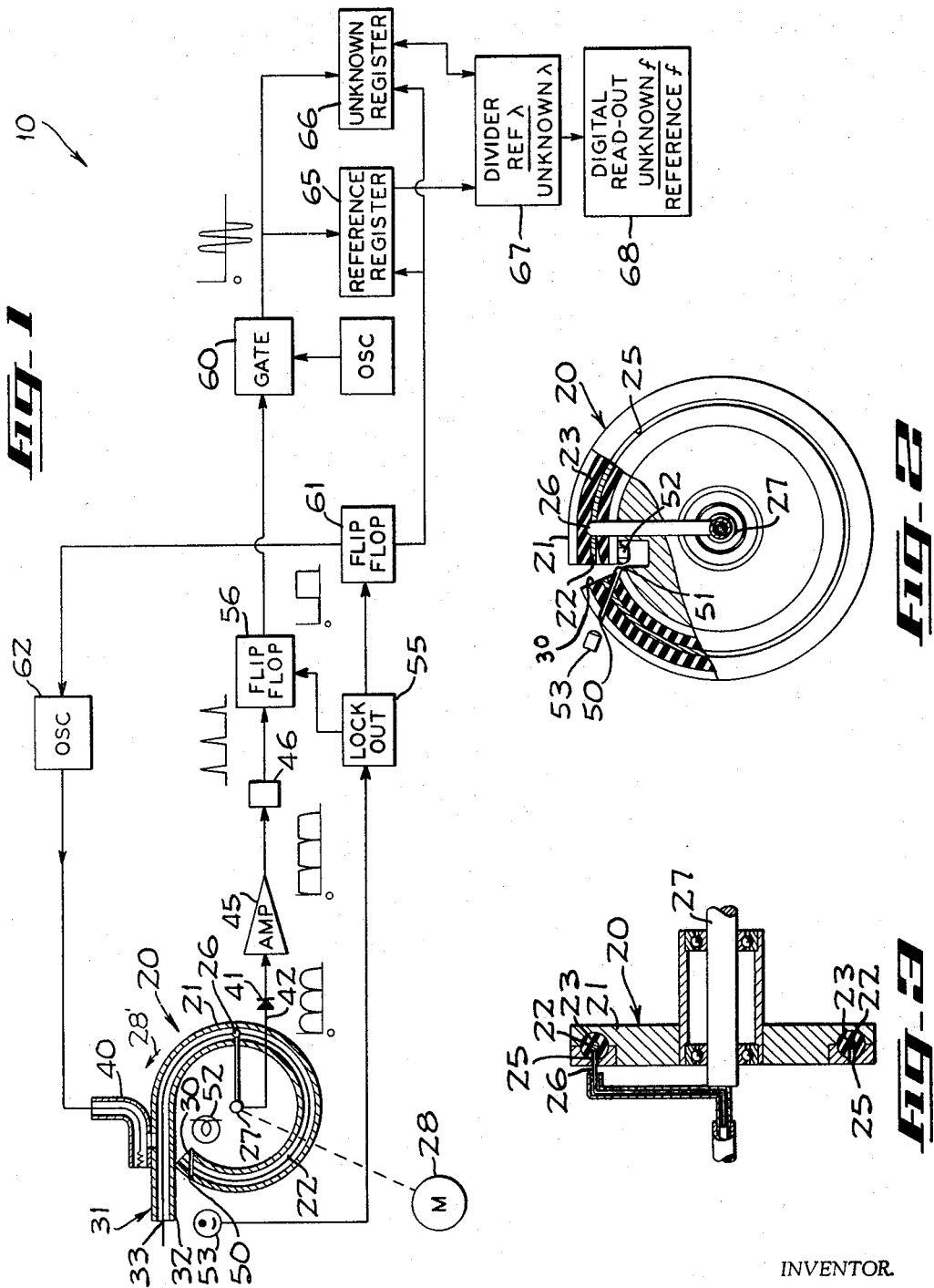
INVENTOR.
FRED W. KRUSE, JR.
BY *Jack M. Wiseman*
ATTORNEY

United States Patent Office 3,308,291
Patented Mar. 7, 1967

3,308,291
MICROWAVE FREQUENCY MEASURING BY ALTERNATELY SAMPLING THE STANDING WAVE PATTERN OF REFERENCE AND UNKNOWN FREQUENCY SIGNALS IN A WAVEGUIDE
Fred W. Kruse, Jr., 3230 Ross Road,
Palo Alto, Calif. 94303
Filed Jan. 27, 1964, Ser. No. 340,435
7 Claims. (Cl. 250—39)

The present invention relates in general to systems for measuring the frequency of microwave signals, and more particularly to a system for measuring the frequency of microwave signals to present the same in a digital readout form.

An object of the present invention is to provide an improved system for measuring the frequency of microwave signals.

Another object of the present invention is to provide a more accurate system for automatically measuring the frequency of microwave signals.

Another object of the present invention is to provide a system for measuring the frequency of microwave signals and presenting the same in a digital readout form.

Another object of the present invention is to provide a system for measuring the frequency of microwave signals to present the same in a digital readout form representative of a ratio between an unknown frequency and a reference frequency.

Other and further objects and advantages of the present invention will be apparent to one skilled in the art from the following description taken in conjunction with the accompanying drawings, in which:

FIG. 1 is a diagrammatic illustration of the microwave frequency measuring system of the present invention.

FIG. 2 is an enlarged front elevational view of the circular coaxial transmission line employed in the frequency measuring system of the present invention.

FIG. 3 is a longitudinal sectional view taken along an axis perpendicular to the plane of the circular coaxial transmission line shown in FIG. 2.

In the microwave frequency measuring system of the present invention, a circular coaxial transmission line has standing wave patterns appearing along the length thereof sampled by a continuously rotating probe. During one complete revolution of the waveform sampling probe, an unknown microwave frequency provides a waveform along the circular transmission line that induces a voltage signal in the probe which corresponds to its wavelength pattern. A circuit connected to the probe transmits signals proportional to the wavelength of the unknown frequency waveform pattern. An unknown frequency counter-register circuit in response to the transmitted signals counts and stores a fixed frequency signal that is commensurate with the wavelength of the unknown frequency waveform pattern appearing along the circular coaxial transmission line.

During the succeeding complete revolution of the waveform sampling probe, a reference microwave frequency provides a waveform pattern along the circular transmission line that induces a voltage signal in the probe which corresponds to its wavelength pattern. The circuit connected to the probe emits signals proportional to the wavelength of the reference frequency waveform pattern. A reference frequency counter-register circuit in response to the last-mentioned emitted signals counts and stores a fixed frequency signal that is commensurate with the wavelength of the reference frequency waveform pattern along the circular coaxial transmission line.

The output of the reference frequency counter-register circuit and the unknown frequency counter-register circuit is fed to a digital divider which produces a signal representative of the ratio between the reference frequency wavelength and the unknown frequency wavelength. A digital read-out device connected to the digital divider produces for observation a ratio that is proportional between the unknown frequency and the reference frequency.

Illustrated in FIG. 1 is the microwave frequency measuring system 10 of the present invention. Included in the microwave frequency measuring system 10 is a uniform low loss coaxial transmission line 20 that has a substantially annulus or toroidal configuration. Essentially, the coaxial transmission line 20 is a transmission line section shaped into a substantially planar, circular configuration with an outer conductor 21 and an inner conductor 22 disposed along the axis of the outer conductor 21. Conventionally, an insulating spacer 23 maintains the inner conductor 22 coaxial with the outer conductor 21.

Formed in the outer conductor 21 is a substantially circular narrow slit or slot 25 that has its access opening facing the axis which is perpendicular to the plane of the annulus transmission line 20. Received by the substantially annular slit 25 is a probe 26, which has the distal end thereof extending adjacent to the inner conductor 22. A tubular shaft 27 having its axis coincident with the axis that is perpendicular to the plane of the toroidal transmission line 20 supports the probe 26 for rotation. Coupled to the shaft 27 is a suitable motor 28 that imparts continuous rotation to the shaft 27 for continuously rotating the probe 26 in the direction of an arrow 28'. The continuous rotation of the probe 26 causes the probe 26 to sweep the length of the circular transmission line 20 during each complete revolution for sampling the stationary waveform pattern along the coaxial transmission line 20.

At one end of the coaxial transmission line 20 is located a section 30, which shorts the transmission line 20 to produce a standing wave pattern along the length of the transmission line 20. The coaxial transmission line 20 is sufficiently long to permit a pattern of at least one wavelength therealong at the lowest frequency to be measured. In practice, to minimize the effect of field distortions at the input end of the transmission line, the length thereof should permit slightly more than one wavelength.

The radio frequency to be measured or the unknown microwave frequency to be determined is coupled to the opposite end of the circular coaxial transmission line 20 through a connector 31, which is a conventional coaxial transmission line having an axis extending in a rectilinear path. An outer conductor 32 for the connector 31 is fitted to the outer conductor 21 of the transmission line 20 and an inner conductor 33 for the connector 31 is fitted to the inner conductor 22 of the transmission line 20.

A directional coupler 40 is fitted to the end of the coaxial transmission line opposite from the shorted end thereof so that a known or reference signal applied thereto will be directed toward the shorted end of the transmission line 20 and not toward the unknown frequency source.

Connected to the probe 26 is a detector, such as crystal detector 41, which receives the standing wave signal from the probe and demodulates the same. As the probe 26 rotates, the voltage induced therein varies in accordance with the standing wave pattern along the length of the transmission line 20. Any reference to the length of the transmission line 20 as herein employed would be the linear measurement of the circular transmission line 20, if it were formed from the circular configuration into a straight line or along a rectilinear path. The voltage induced in the probe 26 during each complete revolution is one or more cycles of the sine wave standing wave pattern. The induced voltage in the probe 26 is demodulated by the crystal detector 41 to produce in the output thereof a full wave rectified signal.

The rectified signal from the output of the crystal detector 41 is fed to a suitable high gain amplifier 45. A conductor 42 is received by the tubular shaft 27 and connects the output of the probe 26 to the input of the crystal detector 41. The gain of the amplifier 45 is sufficiently high so that the signal applied to the input thereof drives the amplifier 45 to the limits of its dynamic range, whereby the output thereof is a clipped signal.

Connected to the output of the amplifier 45 is a conventional waveshaper circuit 46, which produces in the output thereof during each complete revolution of the probe 26 three or more pulses. The time period or direction between successive pulses in the output of the waveshaper circuit 46 represents or is proportional to a half wavelength of the signal sampled by the probe 26 along the circular transmission line 20.

According to the present invention narrow openings or apertures 50 and 51 (FIG. 2) are formed in the outer conductor 21 of the circular transmission line 20 and the section 30, respectively, to define therebetween a straight line or a rectilinear path radially inward of the inner conductor 22. This rectilinear path is so arranged that the probe 26 is disposed within or intersects the path as it advances toward the section 30 or the shorted end of the transmission line 20.

Adjacent to the opening 50 is located a source of light 52, which projects a narrow beam of light along said path toward the aperture 51. Disposed adjacent to the aperture 51 is a photocell 53, which emits a probe sweep start pulse each time the probe 26 interrupts the beam of light as it advances toward the section 30 or the shorted end of the transmission line 20. Connected to the photocell 53 and operatively responsive to the probe sweep start pulse emitted therefrom is a lock-out circuit 55, which is a monostable multivibrator or a circuit that emits a fixed, narrow, rectangular pulse.

The lock-out circuit 55 controls the operation of a flip-flop circuit 56 in timed relation to the rotation of the probe 26 advancing toward the shorted end of the transmission line 20 or the commencement of rotation for the probe 26. As previously described, the waveshaper circuit 46 produces in the output three or more pulses during each complete revolution of the probe 26. The time period or duration between successive pulses in the output of the shaping circuit 46 represents or is proportional to a half wavelength of the signal sampled by the probe 26 along the circular transmission line 20.

Connected to the output of the shaping circuit 46 is the flip-flop circuit 56. The lock-out circuit 55 is arranged so that the flip-flop circuit 56 is not triggered in response to the first pulse (occurring at the shorted end) of each complete revolution of the probe 26 emitted thereto by the differentiating circuit 46, but rather is triggered during each complete revolution of the probe 26 by the two successive pulses. Any error from the loss of signal as the probe advances beyond the input to the transmission line 20 is thereby eliminated.

Thus, a single rectangular or square wave pulse is produced by the flip-flop circuit 56 during each complete revolution of the probe 26. The duration of the pulse in the output of the flip-flop circuit 56 is proportional to the transit time of the probe 26 from the first standing wave null after advancing past the section 30 to the second null, which in turn is proportional to a half wavelength of the signal sampled by the probe 26 along the transmission line 20. Stated otherwise, by differentiating the clipped output signal of the amplifier 45 and feeding the differentiating signal to the flip-flop circuit 56, the output of the flip-flop circuit 56 has produced therein a square or rectangular wave having a period proportional to the wavelength of the signal sampled by the continuously rotating probe 26 along the length of the circular coaxial transmission line 20.

From the foregoing, it is observed that the flip-flop circuit 56 was prevented by the lock-out circuit 55 from being triggered when the probe 26 advanced toward the section 30 at the shorted end of the transmission line 20. By preventing the flip-flop circuit 56 from firing at the time the probe 26 advanced toward the section 30, error in the first half wavelength arising out of field distortion at the shorted end of the transmission line 20 was eliminated.

The output of the flip-flop circuit 56 is connected to a conventional gated high frequency stable oscillator 60. As a consequence thereof, the gated high frequency stable oscillator 60 will produce fixed frequency signals for a time duration equal to the period of the rectangular pulse emitted by the flip-flop circuit 56 or equal to a time duration proportional to one-half of wavelength of the signal sampled by the continuously rotating probe 26 along the length of the circular coaxial transmission line 20.

As shown in FIG. 1, the lock-out circuit 55 also controls the operation of a second flip-flop circuit 61. The flip-flop circuit 61 in turn controls the operation of a high frequency precision oscillator 62, which produces a standard or reference microwave signal for the microwave frequency measuring system 10 of the present invention. The lock-out circuit 55 controls the operation of the oscillator 62 through a flip-flop circuit 61 so that the oscillator 62 produces a conventional signal, such as at one thousand megacycles, during every other or alternate complete revolutions of the probe 26 along the transmission line 20.

In addition to the foregoing, the flip-flop circuit 61 is connected to a reference frequency counter-register circuit 65 and an unknown frequency counter-register circuit 66 to control the time periods in which the counter-register circuits 65 and 66 are capable of receiving input signals and to reset the same for every two complete revolutions of the probe 26. Specifically, the flip-flop 61 controls the operation of the counter-register circuits 65 and 66 so that they cannot receive input signals simultaneously, but, rather, receive input signals during alternate time periods. Also, the flip-flop circuit 61 resets the counter-register circuits 65 and 66 for every two complete revolutions of the probe 26.

Connected to the input circuits of the counter-register circuits 65 and 66 is the gated high frequency stable oscillator 60. Under the control of the flip-flop circuit 61, the reference signal counter-register circuit 65 and the unknown frequency counter-register circuit 66 will count and store the signals produced from the output of the gated oscillator 60 at alternate time periods. The flip-flop circuit 61 is so arranged that the reference signal counter-register circuit 65 counts and stores the output signals from the gated oscillator 60 during the time the oscillator 62 is oscillating and the unknown signal counter-register circuit 66 receives the output signals from the unknown counter-register circuit during the time the oscillator 62 is not oscillating. The power level of the standard or reference signal produced by the oscillator 62 is much greater than the power level of the unknown frequency and, hence, the reference signal will predominate over the unknown frequency, when the oscillator 62 is operating, in the coaxial transmission line 20.

The counter-register circuits 65 and 66 will accumulate and store respectively counts in accordance with the duration of the oscillations fed thereto by the gated oscillator 60 and, hence, in proportion to the wavelengths of the signals sampled by the probe 26 along the coaxial transmission line 20. Therefore, the counter-register circuit 65 accumulates the reference frequency signal count and the counter-register circuit 66 accumulates the unknown frequency signal count.

Connected to the output of the counter-register circuits 65 and 66 is a divider circuit 67, which produces in the output thereof a signal representative of the ratio between the reference signal count fed thereto by the counter-register circuit 65 and the unknown frequency signal count fed thereto by the counter-register circuit 66.

The output of the divider circuit 67 is fed to a digital read-out device 68, which gives a digital reading of the ratio between the unknown frequency with respect to the reference frequency. For permanent recording, the data recorded by the read-out device 68 can be fed to a digital printer.

In the operation of the microwave frequency measuring system 10 of the present invention, an unknown microwave frequency is fed to the transmission line section 31, which in turn appears across the circular transmission line 20 as a stationary wave pattern.

The unknown frequency appearing along the length of the circular transmission line 2 is sampled by the continuously sweeping probe 26. This results in a voltage signal being induced in the probe 26 representative of the wavelength of the unknown frequency. The crystal detector 41 rectifies the output from the probe 26 to produce during a complete sweep of the probe 26 a full wave rectified signal representative of at least one wavelenght of the unknown frequency.

The rectified signal is fed to the amplifier 45 that produces a clipped signal, which in turn is transmitted to the shaper circuit 46. As the probe 26 advances toward the shorted end of the transmission line 20, the photocell 53 emits a pulse start signal to the locking-out circuit 55, which in timed relation with the probe 26 enables the flip-flop circuit 56 to produce a rectangular pulse from the two successive pulses of the waveshaper circuit 46 following the first pulse thereof during the complete sweep of the probe 26. The time duration between the successive pulses is proportional to a half wavelength of the unknown frequency. Hence, the period of the rectangular pulse produced by the flip-flop circuit 56 is proportional to a one-half wavelength of the unknown frequency.

The rectangular pulse of the flip-flop circuit 56 is fed to the gated oscillator 60 which produces fixed frequency signals for a time duration proportional to one-half the wavelength of the unknown frequency. In turn, the output of the gated oscillator 60 is counted and stored by the unknown counter-register circuit 66 under the control of the lock-out circuit 55 through the flip-flop circuit 61. The foregoing is completed during the first complete sweep of the probe 26.

During the second complete sweep of the probe 26, the photocell 53 emits a start pulse as the probe 26 sweeps toward the shorted end of the transmission line 20. Thereupon, the lock-out circuit 55 triggers the flip-flop circuit 61, which, in turn, causes the oscillator 62 to produce in the output thereof a reference microwave signal. The reference signal is transmitted to the circular coaxial transmission line 20 through the directional coupler 40.

Now, the probe 26 samples the reference frequency signal appearing along the length of the circular transmission line 20. The power level of the reference signal greatly exceeds that of the unknown signal and, hence, will predominate along the transmission line 20. This action results in a voltage signal being induced in the probe 26 representative of the wavelength of the reference frequency signal. At this time, the crystal detector 41 produces full wave rectified signals representative of one and one-half wavelengths of the reference frequency signal during a complete revolution of the probe 26.

The rectified signal is fed to the amplifier 45 that produces a clipped signal, which, in turn, is fed to the shaper circuit 46. As the probe 26 swept toward the shorted end of the transmission line 20 for the second time, the pulse emitted by the photocell 53 caused the locking circuit 55 to control the operation of the flip-flop circuit 56. This resulted in the flip-flop circuit 56 producing in the output thereof a rectangular pulse proportional to a half wavelength of the reference frequency signal.

The just-mentioned rectangular pulse is fed to the gated oscillator 60, which then produces fixed frequency signals for a time duration proportional to one-half of the wavelength of the reference frequency signal. However, through the action of the lock-out circuit 55 and the flip-flop circuit 61, the output of gated oscillator 60 during the second sweep of the probe 26 is counted and stored by the reference frequency counter-register circuit 65 and not by the unknown counter-register circuit 66.

Subsequently, the outputs of the reference frequency counter-register circuit 65 and the unknown frequency counter-register circuit 66 is fed to the divider circuit 67, which produces an output signal representative of the ratio between the reference frequency wavelength and the unknown frequency wavelength. This ratio signal is now fed to the digital read-out on which can be observed the ratio of the unknown frequency with respect to the reference frequency. The above cycles are repeated each time it is desired to measure an unknown frequency.

It is to be observed that in practice, it may be more desirable to rotate the circular transmission line 20 instead of the probe 26, since the making of electrical connections would be facilitated. Other systems and techniques for synchronizing or triggering may be employed in lieu of the photoelectric method herein described. An open ended transmission at times may be employed in lieu of a shorted transmission line to reduce overall length required at minimum frequency. Under such circumstances, a simplified synchronizing system can be used to synchronize the circuitry with the cyclic movement of the probe.

Also, it is within the contemplation of the present invention that two similar transmission lines 20 and probes 26 may be employed. Under such conditions, the reference signal can be fed to one line and the unknown signal to the other line with the result that the readings may be taken simultaneously during each revolution of the probes, and the ratio can be taken immediately without the use of storage registers.

It is to be understood that modifications and variations of the embodiment of the invention disclosed herein may be resorted to without departing from the spirit of the invention and the scope of the appended claims.

Having thus described my invention, what I claim as new and desire to protect by Letters Patent is:

1. A frequency measuring system comprising a substantially circular coaxial transmission line, unknown frequency signal transmitting means connected to said coaxial transmission line for producing along said coaxial transmission line a waveform pattern representative of the frequency of the unknown frequency signal, reference frequency signal transmitting means connected to said coaxial transmission line for producing along said coaxial transmission line a waveform pattern representative of the frequency of the reference signal, a probe disposed in engagement with said transmission line for sampling the waveform patterns along said coaxial transmission line, means imparting relative movement between said coaxial transmission line and said probe for inducing in said probe signals representative of the wavelengths of the waveform patterns along said coaxial transmission line, means responsive to the relative movement between said probe and said coaxial transmission line and connected to said reference signal transmitting means for exciting said reference frequency signal transmitting means during alternate sweep cycles of said probe whereby said probe emits in succession signals representative of the waveform pattern of the unknown frequency signal and signals representative of the waveform pattern of the reference frequency signal, and circuit means connected to said transmission line and responsive to the signals emitted by said probe for registering a digital representation of the ratio between the frequency from said unknown frequency signal transmitting means and the frequency from said reference frequency signal transmitting means.

2. A frequency measuring system comprising a substantially circular transmission line, shorting means disposed at a cycle start portion of said transmission line for shorting said cycle start portion of said transmission line, unknown frequency signal transmitting means connected to said transmission line for producing along said transmission line a waveform pattern representative of the frequency of an unknown frequency signal, a probe disposed in engagement with said transmission line for sampling the waveform pattern along said transmission line, means imparting relative movement between said transmission line and said probe for emitting from said probe a plurality of successive signals representative of the wavelength of the waveform pattern along said transmission line, pulse circuit means connected to said probe and responsive to the signals emitted from said probe for producing a pulse proportional to the wavelength of said unknown frequency signal, means responsive to said probe sweeping said cycle start portion of said transmission line and connected to said pulse circuit means for controlling the operation of said pulse circuit means to respond to the signals emitted by said probe after said probe advances beyond the cycle start portion of said transmission line, and circuit means connected to said pulse circuit means and responsive to said pulse produced by said pulse circuit means for registering a digital representation of the frequency for said unknown frequency signal transmission means.

3. A frequency measuring system comprising a substantially circular coaxial transmission line, shorting means disposed at a cycle start portion of said transmission line for shorting said cycle start portion of said transmission line, unknown frequency signal transmitting means connected to said coaxial transmission line for producing along said coaxial transmission line a waveform pattern representative of the frequency of the unknown frequency signal, reference frequency signal transmitting means connected to said coaxial transmission line for producing along said coaxial transmission line a waveform pattern representative of the reference frequency signal and having a power level greater than the power level of said source of unknown frequency signal, a probe disposed in engagement with said transmission line for sampling the waveform patterns along said coaxial transmission line, means imparting relative movement between said transmission line and said probe for emitting from said probe a plurality of successive signals representative of the wavelength of the waveform pattern along said transmission line, pulse circuit means connected to said probe and responsive to the signals emitted from said probe for producing a pulse proportional to the wavelength of the waveform pattern along said transmission line, means connected to said reference signal transmitting means and responsive to said probe sweeping said cycle start portion of said transmission line for controlling the excitation of said reference frequency signal transmitting means to transmit said reference frequency signal during alternate sweep cycles of said probe whereby said probe emits in succession signals representative of the waveform pattern of the reference frequency signal and for controlling the operation of said pulse circuit means to respond to the signals emitted by said probe after said probe sweeps beyond the cycle start portion of said transmission line, and circuit means connected to said pulse circuit means and responsive to the pulses produced by said pulse circuit means for registering a digital representation of the ratio between the frequency from said unknown frequency transmitting means and the frequency from said reference frequency signal transmitting means.

4. A frequency measuring system comprising a transmission line, means connected to said transmission line for producing therealong a waveform pattern of the unknown frequency of a signal, means connected to said transmission line for producing therealong a waveform pattern of the frequency of a reference signal, means disposed in engagement with said transmission line for sampling the waveform pattern along said transmission line, pulse circuit means connected to said waveform pattern sampling means for producing a pulse proportional to the wavelength of said unknown frequency signal and for producing a pulse proportional to the wavelength of said reference frequency signal, an unknown frequency counter-register circuit connected to said pulse circuit means for counting and storing a signal proportional to the wavelength of said unknown frequency signal, a reference frequency counter-register circuit connected to said pulse circuit means for counting and storing a signal proportional to the wavelength of said reference frequency signal, and circuit means connected to said unknown frequency counter-register circuit and said reference frequency counter-register circuit for registering a digital representation of a ratio between the frequency of said unknown frequency signal and the frequency of said reference frequency signal.

5. A frequency measuring system comprising a transmission line, means connected to said transmission line for producing therealong a waveform pattern of the unknown frequency of a signal, reference frequency means connected to said transmission line for producing therealong a waveform pattern of the frequency of a reference signal, probe means disposed in engagement with said transmission line for sampling the waveform pattern along said transmission line, means connected to said reference frequency means for controlling the excitation of said reference frequency means whereby said probe means samples alternately along said transmission line the waveform pattern of said unknown frequency signal and the waveform pattern of said reference frequency signal, pulse circuit means connected to said probe means for producing in succession a pulse proportional to the wavelength of said unknown frequency signal and a pulse proportional to the wavelength of said reference frequency signal, an unknown-frequency counter-register circuit connected to said pulse circuit means for counting and storing a signal proportional to the wavelength of said unknown frequency signal, a reference frequency counter-register circuit connected to said pulse circuit means for counting and storing a signal proportional to the wavelength of said reference frequency signal, and circuit means connected to said unknown frequency counter-register circuit and said reference frequency counter-register circuit for registering a digital representation of a ratio between the frequency of said unknown frequency signal and the frequency of said reference frequency signal.

6. A frequency measuring system comprising a transmission line, means connected to said transmission line for producing therealong a waveform pattern of the unknown frequency of a signal, reference frequency means connected to said transmission line for producing therealong a waveform pattern of the frequency of a reference frequency, probe means disposed in engagement with said transmission line for sampling the waveform patterns along said transmission line, pulse circuit means connected to said probe means for producing a pulse proportional to the wavelength of said unknown frequency signal and for producing a pulse proportional to the wavelength of said reference frequency signal, an unknown frequency counter-register circuit connected to said pulse circuit means, a reference frequency counter-register circuit connected to said pulse circuit means, means connected to said reference frequency means for controlling the excitation of said reference frequency means whereby said probe means samples alternately the waveform pattern of said unknown frequency signal and the waveform pattern of said reference frequency signal and also controlling said unknown frequency counter-register circuit and said reference frequency counter-register circuit whereby said unknown frequency counter-register circuit counts and stores a signal proportional to the wavelength of said unknown frequency signal while said reference frequency means is not excited and said reference frequency counter-register circuit counts and stores a signal proportional to the wavelength of said reference frequency signal while said reference frequency means is excited, and circuit means connected to said unknown frequency counter-register circuit and said reference frequency counter-register circuit for registering a digital representation of a ratio between the frequency of said unknown frequency signal and the frequency of said reference frequency signal.

7. A frequency measuring system comprising a substantially circular coaxial transmission line, shorting means disposed along said transmission line for shorting one end of said transmission line, means connected to said transmission line for feeding an unknown signal to the other end of said transmission line for producing therealong a waveform pattern representative of the frequency of the unknown frequency signal, reference signal means connected to said transmission line for feeding a reference signal to said other end of said transmission line for producing therealong a waveform pattern representative of the frequency of the reference frequency signal, a probe disposed in engagement with said transmission line for sampling the waveform patterns along said waveform patterns along said transmission line, means connected to said probe for rotating said probe along said transmission line to induce in said probe signals representative of the wavelength of waveform patterns sampled by said probe, a detector connected to said probe for rectifying the signals emitted from said probe, an amplifier circuit connected to said detector for amplifying and clipping the rectified signals, a waveshaping circuit connected to said amplifier for producing successive signals having a space therebetween proportional to the wavelength of the waveform pattern sampled by said probe, a flip-flop circuit responsive to the signals produced by said wave shaping circuit connected to said wave shaping circuit and for producing a pulse having a period proportional to the waveform pattern sampled by said probe, a gated oscillator connected to said flip-flop circuit and responsive to the pulse produced by said flip-flop circuit for producing fixed frequency signals for a time duration commensurate with the period of the pulse produced by said flip-flop circuit, an unknown frequency counter-register circuit connected to said gated oscillator, a reference frequency counter-register circuit connected to said gated osillator, photoelectric means operative for emitting a pulse each time said probe advances toward the shorted end of said transmission line, a triggering circuit connected to said flip-flop circuit for controlling the operation of said flip-flop circuit whereby said flip-flop circuit produces a pulse in response to signals produced by said waveshaping circuit following the signal produced while said probe is advancing toward the shorted end of said transmission line, a flip-flop circuit connected to said triggering circuit and said reference signal means and controlled by said triggering circuit for exciting said reference signal means during alternate complete revolutions of said probe and for controlling said reference frequency counter-register circuit to count and store the signal produced by said gated oscillator circuit while said reference signal means is excited and for controlling said unknown frequency counter-register circuit to count and store the signal produced by said gated oscillator while said reference signal means is not excited, a divider connected to said reference frequency counter-register circuit and said unknown frequency counter-register circuit to produce a signal representative of the ratio between the wavelength of the reference frequency signal and the wavelength of the unknown frequency signal, and digital readout means connected to said divider for registering the digital representation of a ratio between the unknown frequency and the reference frequency.

References Cited by the Examiner
UNITED STATES PATENTS

| | | | |
|---|---|---|---|
| 2,400,597 | 5/1946 | Peterson | 250—39 X |
| 2,680,837 | 6/1954 | Sensiper | 324—58 |
| 2,951,202 | 8/1960 | Gordon | 324—79 |
| 3,161,825 | 12/1964 | Wilkinson | 324—58 |

WALTER L. CARLSON, *Primary Examiner.*

P. F. WILLIE, *Assistant Examiner.*